United States Patent [19]

Wada et al.

[11] 4,431,558

[45] Feb. 14, 1984

[54] HEAT ACCUMULATING MATERIAL

[75] Inventors: Takahiro Wada, Katano; Ryoichi Yamamoto, Neyagawa, both of Japan

[73] Assignee: Matsushita Electric Industrial Co., Ltd., Osaka, Japan

[21] Appl. No.: 397,450

[22] Filed: Jul. 12, 1982

[30] Foreign Application Priority Data

Jul. 21, 1981 [JP] Japan .................................. 56-114811

[51] Int. Cl.$^3$ ................................................ C09K 5/06
[52] U.S. Cl. ...................................... 252/70; 423/497; 564/63
[58] Field of Search .......................... 252/70; 423/497; 564/63

[56] References Cited

FOREIGN PATENT DOCUMENTS 55-149373 11/1980 Japan ..................................... 252/70
7801037 9/1979 Sweden ................................. 252/70

OTHER PUBLICATIONS

Malec et al., "Heat of Solution of Urea in Water and Aqueous Solutions of Calcium Chloride . . . ", Rocz. Chem., 1971, 45 (9), 1369–1375.
Kuemmel et al., "Osmotic and Activity Coefficients in . . . Water–Calcium Chloride–Urea at 298.15K," Fluid Phase Equilib., 1978, 2(3), 215–223.

Primary Examiner—John E. Kittle
Assistant Examiner—Robert A. Wax
Attorney, Agent, or Firm—Stevens, Davis, Miller & Mosher

[57] ABSTRACT

The heat accumulating material of this invention comprising three components of calcium chloride ($CaCl_2$), urea [$CO(NH_2)_2$] and water ($H_2O$) can have varied temperatures of heat accumulating and heat releasing between 15° C. and 29.5° C. by varying the proportion of said three components, and also has a large latent heat. Hence, much expectation can be placed on it as a heat accumulating material for air conditioning. Moreover, by adding $BaFeO_{3-x}$ ($0 \leq x \leq 0.53$) as a nucleating agent to the above-mentioned composition, supercooling can be greatly decreased and wider application of this heat accumulating material becomes possible.

4 Claims, 2 Drawing Figures

HEAT ACCUMULATING MATERIAL

This invention relates to a heat accumulating material, particularly to a latent heat accumulating material comprising three components of $CaCl_2$, $CO(NH_2)_2$ and $H_2O$ as its principal ingredients.

Generally, two types of heat accumulating material are known, one type utilizing the sensible heat of material and the other type making use of the latent heat. The heat accumulating material of the type utilizing the latent heat, as compared with the type utilizing the sensible heat, has the advantage that its heat accumulating capacity per unit weight or unit volume is high, and hence a smaller amount of material is needed for accumulating a required quantity of heat, allowing a size reduction of the heat accumulator. Also, the heat accumulating material making use of the latent heat has an advantageous property that the temperature thereof does not decrease with heat dissipation unlike the heat accumulating material of the type utilizing the sensibile heat. Also, it releases heat of a fixed temperature at the transition point thereof. Especially, the heat accumulating material utilizing the latent heat of fusion of an inorganic hydrate is known for its high heat accumulating capacity per unit mass and per unit volume.

Now, $CaCl_2.6H_2O$ (melting point: 29.5° C.) has a high heat accumulating capacity and much expectation has been placed on it for its utilization as a heat accumulating material, such as for air conditioning systems. However, the melting point of $CaCl_2.6H_2O$ is fixed at 29.5° C., and hence the temperature of heat accumulation and heat releasing is necessarily restricted to that temperature, and this has been a problem for its broader application. Also, $CaCl_2.6H_2O$ has another problem in that, during the repeated fusion and solidification, $CaCl_2.4H_2O$ separates out, causing gradual decrease of latent heat of the system.

An object of this invention is to provide a heat accumulating material having a high heat accumulating capacity and a stable heat absorbing and releasing property at a low cost. The temperature for heat accumulation and heat releasing of which material can be controlled by, in a composition comprising three components of $CaCl_2$, $CO(NH_2)_2$ and $H_2O$ or comprising these as its principal ingredients, varying the proportion of said composition.

The feature of the heat accumulating material according to the present invention consists in comprising three components system of $CaCl_2$, $CO(NH_2)_2$ and $H_2O$ or comprising the system as its principal ingredient. Preferably the material comprises 40–57.5% by weight of $CaCl_2$, 30% by weight or less (excluding 0%) of $CO(NH_2)_2$ and 30–52.5% by weight of $H_2O$ (providing that the total of said three components is 100% by weight). More preferably, the material is of a composition having $CaCl_2.6H_2O$ and $CaCl_2.4CO(NH_2)_2.2H_2O$ as its two end components and containing $CO(NH_2)_2$ in a range of amount of 25% by weight or less (excluding 0%) based on the total amount of $CaCl_2$, $CO(NH_2)_2$ and $H_2O$.

In order to prevent the supercooling of the composition comprising $CaCl_2$, $CO(NH_2)_2$ and $H_2O$, an appropriate nucleating agent such as $BaFeO_{3-x}$ ($0 \leq x \leq 0.53$) is preferably added. The amount of the nucleating agent to be added is preferably 40 parts by weight or less to 100 parts by weight of the composition comprising $CaCl_2$, $CO(NH_2)_2$ and $H_2O$.

The present invention is further described below by way of the embodiments thereof.

EXAMPLE

Commercially available reagent grade $CaCl_2$, $CaCl_2.6H_2O$ and $CO(NH_2)_2$ as well as water purified by distillation followed by ion exchange were used to be mixed in prescribed amounts as shown in Tables 1 and 2. The mixture was heated up to 45° C. to dissolve as much solid as possible, and was used as a sample.

Figure 1:
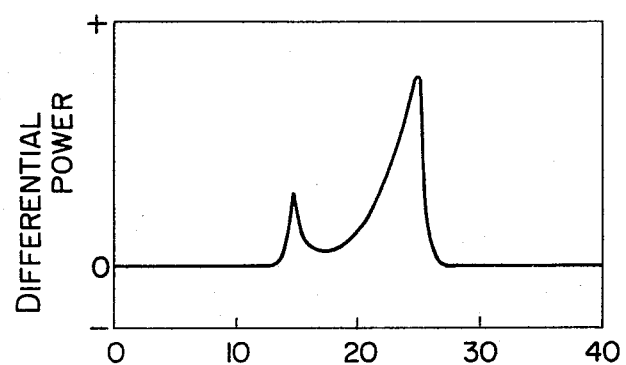
FIG. 1 is a DSC (differential scanning calorimeter) diagram obtained during the fusion of Sample 7.

Each of these samples was measured for its transition temperature and latent heat by use of a differential scanning calorimeter (DSC). The transition temperature was determined from the temperature at the peak of DSC diagram, and the latent heat was determined from the peak area of DSC diagram. The DSC diagram of Sample 7 shown in Table 1 is illustrated in FIG. 1. The samples for which two transition temperatures are indicated in Tables 3 and 4 are those having two peaks in DSC diagram, as seen in the above DSC diagram. Actual transition is considered to occur continuously between these temperatures.

Each of the samples shown in Table 1 is of a composition having $CaCl_2.6H_2O$ and $CaCl_2.4CO(NH_2)_2.2H_2O$ as its two end components, while each of the samples shown in Table 2 is of a composition lying in peripheral area of the composition having $CaCl_2.6H_2O$ and $CaCl_2.4CO(NH_2)_2.2H_2O$ as its both end components.

Needless to say, transitions below 0° C. were not determined since they were considered to be unnecessary in this case. Regarding the ratings shown in Tables 3 and 4, samples having a latent heat not less than 25 cal/g were marked with the symbol o, those having a latent heat not less than 15 and less than 25 cal/g were marked with the symbol Δ, and the others were marked with the symbol x. Samples marked with the symbol o have a high heat accumulating capacity and can be used practically. Samples marked with the symbol Δ are considered to be fairly satisfactory for practical application since, though their heat accumulating capacity is not so high, they have transition temperatures in a temperature range not obtainable by prior heat accumulating materials.

TABLE 1

| Sample No. | Composition (% by weight) | | |
|---|---|---|---|
| | $CaCl_2$ | $CO(NH_2)_2$ | $H_2O$ |
| 1 | 50.6 | 0.2 | 49.2 |
| 2 | 50.5 | 0.4 | 49.1 |
| 3 | 50.4 | 0.6 | 49.0 |
| 4 | 50.3 | 1.1 | 48.6 |
| 5 | 49.9 | 2.2 | 47.9 |
| 6 | 49.5 | 3.2 | 47.3 |
| 7 | 49.1 | 4.3 | 46.0 |
| 8 | 48.8 | 5.3 | 45.9 |
| 9 | 47.9 | 7.9 | 44.2 |
| 10 | 47.4 | 9.3 | 43.3 |
| 11 | 46.8 | 10.9 | 42.3 |
| 12 | 46.3 | 12.4 | 41.3 |
| 13 | 45.7 | 14.0 | 40.3 |
| 14 | 45.2 | 15.5 | 39.3 |

TABLE 1-continued

| Sample No. | Composition (% by weight) | | |
|---|---|---|---|
| | CaCl₂ | CO(NH₂)₂ | H₂O |
| 15 | 44.6 | 17.1 | 38.3 |
| 16 | 43.8 | 18.5 | 37.7 |
| 17 | 41.9 | 24.8 | 33.3 |
| 18 | 41.0 | 27.0 | 32.0 |
| 19 | 40.2 | 29.5 | 30.3 |
| 20 | 39.5 | 31.0 | 29.5 |

TABLE 2

| Sample No. | Composition (% by weight) | | |
|---|---|---|---|
| | CaCl₂ | CO(NH₂)₂ | H₂O |
| 21 | 45.0 | 2.5 | 52.5 |
| 22 | 40.0 | 5.0 | 55.0 |
| 23 | 45.0 | 5.0 | 50.0 |
| 24 | 47.5 | 5.0 | 47.5 |
| 25 | 50.0 | 5.0 | 45.0 |
| 26 | 52.5 | 5.0 | 42.5 |
| 27 | 55.0 | 5.0 | 40.0 |
| 28 | 45.0 | 10.0 | 45.0 |
| 29 | 47.5 | 10.0 | 42.5 |
| 30 | 50.0 | 10.0 | 40.0 |
| 31 | 52.5 | 10.0 | 37.5 |
| 32 | 55.0 | 10.0 | 35.0 |
| 33 | 57.5 | 10.0 | 32.5 |
| 34 | 60.0 | 10.0 | 30.0 |
| 35 | 39.0 | 15.0 | 46.0 |
| 36 | 45.0 | 15.0 | 40.0 |
| 37 | 50.0 | 15.0 | 35.0 |
| 38 | 55.0 | 15.0 | 30.0 |
| 39 | 42.5 | 20.0 | 37.5 |
| 40 | 46.0 | 25.0 | 29.0 |

TABLE 3

| Sample No. | Tdransition temperature (°C.) | Latnet heat (cal/g) | Rating |
|---|---|---|---|
| 1 | 29.3 | 43 | o |
| 2 | 29.1 | 43 | o |
| 3 | 28.9 | 43 | o |
| 4 | 28.2 | 42 | o |
| 5 | 27.3 | 40 | o |
| 6 | 26.0, 15.0 | 39 | o |
| 7 | 25.0, 15.1 | 39 | o |
| 8 | 25.0, 16.0 | 37 | o |
| 9 | 24.0, 16.3 | 37 | o |
| 10 | 22.3, 16.8 | 35 | o |
| 11 | 20.8, 17.3 | 34 | o |
| 12 | 18.1 | 33 | o |
| 13 | 18.1 | 34 | o |
| 14 | 15.8 | 32 | o |
| 15 | 14.1, 0.8 | 28 | o |
| 16 | 14.0, 1.0 | 26 | o |
| 17 | 14.0, 1.6 | 25 | o |
| 18 | 13.2, 1.6 | 23 | Δ |
| 19 | 13.0, 1.7 | 18 | Δ |
| 20 | 13.0, 1.8 | 12 | x |

TABLE 4

| Sample No. | Transition temperature (°C.) | Latent heat | Rating |
|---|---|---|---|
| 21 | 19.5 | 17 | Δ |
| 22 | 4.0 | 10 | x |
| 23 | 19.6 | 20 | Δ |
| 24 | 23.0 | 25 | o |
| 25 | 24.0 | 37 | o |
| 26 | 27.0 | 36 | o |
| 27 | 33.6, 20.0 | 35 | o |
| 28 | 10.3 | 21 | Δ |
| 29 | 20.8, 17.0 | 38 | o |
| 30 | 20.9, 18.3 | 37 | o |
| 31 | 21.3 | 36 | o |
| 32 | 32.6, 18.3 | 33 | o |
| 33 | 32.6, 19.0 | 25 | o |
| 34 | 33.3, 19.3 | 14 | x |
| 35 | 4.3 | 7 | x |
| 36 | 16.3 | 31 | o |
| 37 | 19.6 | 33 | o |
| 38 | 33.0, 20.3 | 24 | o |
| 39 | 16.0, 2.5 | 21 | Δ |
| 40 | 13.0, 1.8 | 10 | x |

When the data shown in Table 3 are examined, in Sample 1, which is of the composition having $CaCl_2 \cdot 6H_2O$ and $CaCl_2 \cdot 4CO(NH_2)_2 \cdot 2H_2O$ as the two end components and contains 0.2% by weight of $CO(NH_2)_2$, the transition point lowers to 29.3° C. and the latent heat is 43 cal/g, approximately equal to that of $CaCl_2 \cdot 6H_2O$. As the content of $CO(NH_2)_2$ is increased, the transition point goes down gradually, accompanied by, though slight, a decrease of the latent heat. When the content of $CO(NH_2)_2$ is 3.2% by weight or more, a transition point appears around 15° C. aside from previous transition point of around 26° C. As the content of $CO(NH_2)_2$ increases further; the transition at around 26° C. shifts to the lower temperature side.

In Sample 12, which contains 12.4% by weight of $CO(NH_2)_2$, the transitions at higher and lower temperature sides are observed in an overlapped state. Accordingly, the composition which contains about 12.4–15.5% by weight of $CO(NH_2)_2$ and has $CaCl_2 \cdot 6H_2O$ and $CaCl_2 \cdot 4CO(NH_2)_2 \cdot 2H_2O$ as its two end components, such as Samples 12, 13 and 14, is an excellent heat accumulating material having a transition point at 15°–18° C. and a large latent heat of 35 cal/g.

In samples containing 17.1% by weight or more of $CO(NH_2)_2$, the transition appears around 1° C. in the further lower temperature side. As the content of $CO(NH_2)_2$ is increased, the latent heat decreases, while the transition around 15° C. shifting toward the lower temperature side and the transition around 1° C. shifting somewhat toward the higher temperature side.

In sum, the heat accumulating material of three components system of $CaCl_2$, $CO(NH_2)_2$ and $H_2O$, which has $CaCl_2 \cdot 6H_2O$ and $CaCl_2 \cdot 4CO(NH_2)_2 \cdot 2H_2O$ as its two end components and contains $CO(NH_2)_2$ in a range of amount of 25% by weight or less (excluding 0%), is a very excellent heat accumulating material unobtainable hitherto, because the heat accumulating and heat releasing temperature can be controlled by varying the percentage composition thereof and yet the material has a latent heat of not less than 25 cal/g.

In the next place, samples shown in Table 4, whose composition lies in the peripherial area of the composition having $CaCl_2 \cdot 6H_2O$ and $CaCl_2 \cdot 4CO(NH_2)_2 \cdot 2H_2O$ as its two end components, are examined for their characteristic properties. Samples 22–27, as apparent from Table 2, are obtained by varying the proportion of $CaCl_2$ and $H_2O$ contained while keeping the content of $CO(NH_2)_2$ at a constant value of 5% by weight. Samples 22, 23 and 24 are those which have their composition in the $H_2O$ excess side, that is, the $CaCl_2$ deficiency side, of the composition having $CaCl_2 \cdot 6H_2O$ and $CaCl_2 \cdot 4CO(NH_2)_2 \cdot 2H_2O$ as its two end components, while Samples 25, 26 and 27 are inversely those which have their composition in the $H_2O$ deficiency side, that is, the $CaCl_2$ excess side, of the composition having $CaCl_2.6H_2O$ and $CaCl_2.4CO(NH_2)_2.2H_2O$ as its both end components. Accordingly, as the content of $CaCl_2$ is increased starting from the composition of Sample 22 lying in the $H_2O$ excess side without varying the content of $CO(NH_2)_2$, namely, as the composition is varied into that of Sample 23 and further into that of Sample 24, the latent heat increases and the transition temperature rises.

In Sample 25, which has the composition nearest to the one having $CaCl_2.6H_2O$ and $CaCl_2.4CO(NH_2)_2.2H_2O$ as its two end components, the latent heat assumes a maximum value. On increasing the $CaCl_2$ content further, there is observed not an increase but a decrease of the latent heat. The transition temperature rises with increasing $CaCl_2$ content without showing any maximum value in the course. Such a relationship can also be observed among the samples containing 10% by weight of $CO(NH_2)_2$, such as Samples 28–34. It is observed that Sample 29, which has the composition nearest to the composition having $CaCl_2.6H_2O$ and $CaCl_2.4CO(NH_2)_2.2H_2O$ as its both end components, has the largest latent heat and that the transition point rises with the increase of the content of $CaCl_2$.

In other words, when compared with the composition having $CaCl_2.6H_2O$ and $CaCl_2.4CO(NH_2)_2.2H_2O$ as its two end components, if the proportion of the $CO(NH_2)_2$ contained is the same, the transition temperature lowers on the $H_2O$ excess side, namely the $CaCl_2$ deficiency side, and inversely, the transition temperature rises somewhat on the $H_2O$ deficiency side, namely the $CaCl_2$ excess side. The latent heat decreases in both cases when the composition shifts toward the $H_2O$ excess side, namely $CaCl_2$ deficiency side, and toward the $H_2O$ deficiency side, namely $CaCl_2$ excess side, from the composition having $CaCl_2.6H_2O$ and $CaCl_2.4CO(NH_2)_2.2H_2O$ as its two end components.

To sum up the results mentioned above, the composition of a heat accumulating material is preferably in the composition area of Samples marked with the symbols of Δ and o shown under the ratings in Tables 3 and 4. In other words, in the three components system comprising $CaCl_2$, $CO(NH_2)_2$ and $H_2O$, it is preferably in the range of 40–57.5% by weight of $CaCl_2$, 30% by weight or less (excluding 0%) of $CO(NH_2)_2$ and 30–52.5% by weight of $H_2O$. More preferably, the material is of the composition having $CaCl_2.6H_2O$ and $CaCl_2.4CO(NH_2)_2.2H_2O$ as its two end components and contains 25% by weight or less (excluding 0%) of $CO(NH_2)_2$ based on the total amount of $CaCl_2$, $CO(NH_2)_2$ and $H_2O$.

When a composition comprising $CaCl_2$, $CO(NH_2)_2$ and $H_2O$ is employed as a heat accumulating material, an appropriate nucleating agent is preferably used for the purpose of decreasing supercooling. It was found that $BaFeO_{3-x}$ ($0 \leq x \leq 0.53$) acts as said nucleating agent for said composition. Since $BaFeO_{3-x}$ ($0 \leq x \leq 0.53$) is a substance of limited solubility in water, it exhibits a nucleating effect in an amount of about 0.01 parts by weight based on 100 parts by weight of said composition. Of course it may also be used in larger amounts.

In use of the heat accumulating material of this invention as a heat accumulator for air conditioners and the like, said material is usually used in an amount of about 100 to 1000 kg. In this case, even if the composition comprising $CaCl_2$, $CO(NH_2)_2$ and $H_2O$ is fused down, the whole system would not become a uniform composition, and a solution with a low $CaCl_2$ concentration would exist in the upper portion while the precipitate of the nucleating agent and a high concentration solution of $CaCl_2$ and the nucleating agent would stay in the lower portion. Therefore, even if the amount of the nucleating agent added in the composition is far less than the minimum amount which would be required when the whole system forms a uniform solution, said nucleating agent would not dissolve completely, and would retain and perform its due action. The minimum amount of the nucleating agent necessary for forming the crystal nuclei, that is, the lower limit of the amount to be mixed, depends, accordingly, on the amount and constitution of the composition employed as well as the size and form of the container which holds the accumulating material. Thus, the amount of the nucleating agent to be actually used needs to be chosen according to the conditions of use.

However, addition of the nucleating agent in a too great amount leads to a substantial reduction of heat accumulating capacity of the heat accumulating material as a whole. For practical use, therefore, it is desirable that the nucleating agent is blended in an amount not exceeding 40 parts by weight to 100 parts by weight of the composition comprising $CaCl_2$, $CO(NH_2)_2$ and $H_2O$.

The $BeFeO_{3-x}$ used as the nucleating agent was obtained by mixing $BaCO_3$ or $Ba(NO_3)_2$ with $Fe_2O_3$ in a molar ratio of 1:1 and then burning the mixture in an oxygen gas atmosphere. The value of x was determined by chemical analysis.

This invention is further illustrated with reference to Example. The compositions of samples used in Example are shown in Table 5.

TABLE 5

| Sample No. | Composition (% by weight) | | | Nucleating agent | |
|---|---|---|---|---|---|
| | $CaCl_2$ | $CO(NH_2)_2$ | $H_2O$ | $BaFeO_{3-x}$ | Amount added (g) |
| 51 | 50.3 | 1.1 | 48.6 | $BaFeO_{2.47}$ | 0.01 |
| 52 | 50.3 | 1.1 | 48.6 | $BaFeO_{2.74}$ | 0.01 |
| 53 | 50.3 | 1.1 | 48.6 | $BaFeO_{3.00}$ | 0.01 |
| 54 | 50.3 | 1.1 | 48.6 | $BaFeO_{2.74}$ | 1.0 |
| 55 | 50.3 | 1.1 | 48.6 | $BaFeO_{2.74}$ | 40.0 |
| 56 | 50.5 | 0.4 | 49.1 | $BaFeO_{2.74}$ | 1.0 |
| 57 | 49.9 | 2.2 | 47.9 | $BaFeO_{2.74}$ | 1.0 |
| 58 | 48.8 | 5.3 | 45.9 | $BaFeO_{2.74}$ | 1.0 |
| 59 | 46.3 | 12.4 | 41.3 | $BaFeO_{2.74}$ | 1.0 |
| 60 | 45.2 | 15.5 | 39.3 | $BaFeO_{2.74}$ | 1.0 |

The amount added of the nucleating agent indicated in Table 5 is based on 100 g of the composition comprising $CaCl_2$, $CO(NH_2)_2$ and $H_2O$.

Eight hundred grams of each of Samples 41 to 50 was placed respectively in a cylindrical vessel measuring 100 mm in inner diameter and 100 mm in height, and the vessel was tightly closed by a plug having a thermocouple insert tube. The vessel was then subjected to repeated heating and cooling between 0° C. and 35° C. In every case, the supercooling broke in a temperature range 2° C. to 4° C. below the solidification temperature, no deposition of $CaCl_2.4H_2O$ was observed, and fusion and solidification could be repeated in a stable state. When a sample of $CaCl_2.6H_2O$ to which a small amount of $BaFeO_{2.74}$ had been added was subjected to repeated heating and cooling under the same conditions, though the supercooling was broken satisfactorily, $CaCl_2.4H_2O$ separated out and the latent heat of the sample decreased gradually.

Figure 2:
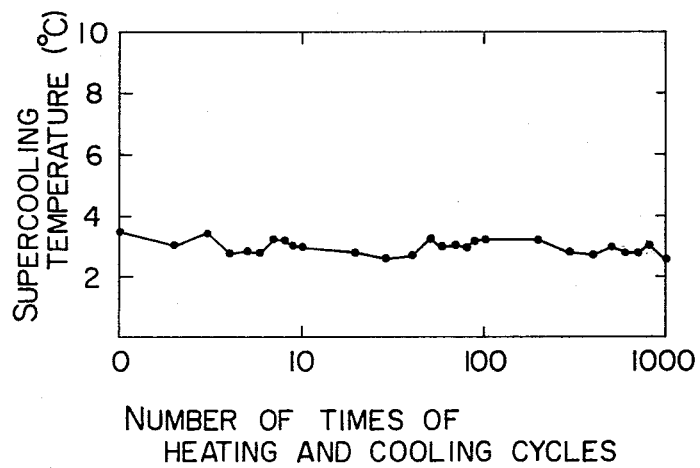
FIG. 2 is a graph showing the changes in the degree of supercooling (difference between the solidification temperature and the temperature at which supercooling is broken) of Sample 54 when it is subjected to 1000 consecutive repeated heating and cooling cycles.

FIG. 2 shows the changes of the degree of supercooling (difference between the solidification temperature and the temperature at which supercooling is broken) observed when Sample 54 was subjected to 1000 consecutive repeated heating and cooling cycles.

All of these samples had a latent heat of 25 cal/g or more and had a sufficient heat accumulating capacity for use as a heat accumulating material.

From the foregoing, it was confirmed that the heat accumulating material of this Example has a stable heat absorbing and heat releasing property and no problem is encountered even in continuous use.

As described above, the heat accumulating material of this invention comprises three components of $CaCl_2$, $CO(NH_2)_2$ and $H_2O$ or comprises these as its principal ingredients, the heat accumulating and heat releasing temperature of said material can be controlled by varying the proportion of these three components, and moreover, supercooling of said material can be decreased by employing a nucleating agent such as $BaFeO_{3-x}$ ($0 \leq x \leq 0.53$), and the material has a very stable heat absorbing and heat releasing property as well as a high heat accumulating capacity.

It is needless to say that, in the present invention, other fusing point depresser may be jointly used, other nucleating agent may be used, a thickening agent for preventing sedimentation or aggregation of the nucleating agent may be used, and other additives may be optionally incorporated. The heat accumulating material of this invention can be used not only for a heat accumulator of an air conditioner for room cooling and heating purpose, but for all fields of applications utilizing heat accumulation.

What is claimed is:

1. A heat accumulating material characterized in that $CaCl_2$, $CO(NH_2)_2$ and $H_2O$ are present in a composition of 40–57.5% by weight of $CaCl_2$, 30% by weight or less (excluding 0%) of $CO(NH_2)_2$ and 30–52.5% by weight of $H_2O$.

2. The heat accumulating material according to claim 1, characterized in that $CaCl_2$, $CO(NH_2)_2$ and $H_2O$ are present in a composition having $CaCl_2.6H_2O$ and $CaCl_2.4CO(NH_2)_2.2H_2O$ as its two end components and containing 25% by weight or less (excluding 0%) of $CO(NH_2)_2$.

3. A heat accumulating material according to claim 1, characterized in that $BaFeO_{3-x}$ ($0 \leq x \leq 0.53$) is added to a composition comprising $CaCl_2$, $CO(NH_2)_2$ and $H_2O$.

4. The heat accumulating material according to claim 3, characterized in that the $BaFeO_{3-x}$ ($0 \leq x \leq 0.53$) is added in a range of 40 parts by weight or less (excluding 0 parts) to 100 parts by weight of the composition comprising $CaCl_2$, $CO(NH_2)2$ and $H_2O$.

* * * * *